United States Patent [19]

Germain et al.

[11] Patent Number: 4,983,300

[45] Date of Patent: Jan. 8, 1991

[54] PROCESS FOR THE REEXTRACTION IN AQUEOUS SOLUTION OF THE PLUTONIUM PRESENT IN AN ORGANIC SOLVENT, MORE PARTICULARLY USABLE FOR SPLITTING URANIUM AND PLUTONIUM

[75] Inventors: Michel Germain, Marcoussis; Bruno Gillet, Meudon la Foret; Jean-Yves Pasquiou, Gif sur Yvette, all of France

[73] Assignee: Commissariat a l'Energie Atomique, Paris, France

[21] Appl. No.: 285,768

[22] Filed: Dec. 16, 1988

[30] Foreign Application Priority Data

Dec. 18, 1987 [FR] France .................. 87 17726

[51] Int. Cl.$^5$ ............................. B01D 11/04
[52] U.S. Cl. ......................... 210/634; 423/9; 423/10
[58] Field of Search ............ 210/638, 634; 423/8, 423/9, 10

[56] References Cited

U.S. PATENT DOCUMENTS

| | | | |
|---|---|---|---|
| 2,865,705 | 12/1958 | James et al. | 23/14.5 |
| 3,092,446 | 4/1963 | Morgan et al. | 23/14.5 |
| 3,981,961 | 9/1976 | Bathellier et al. | 423/10 X |
| 3,987,145 | 10/1976 | Bruns et al. | 423/10 |
| 4,229,421 | 10/1980 | Chapman et al. | 423/10 |
| 4,764,352 | 8/1988 | Bathellier et al. | 423/70 X |

FOREIGN PATENT DOCUMENTS

| | | |
|---|---|---|
| 1387127 | 12/1964 | France . |
| 1561082 | 3/1969 | France . |
| 2003831 | 11/1969 | France . |
| 2553560 | 4/1985 | France . |
| 42162 | 10/1962 | Luxembourg . |
| 48589 | 7/1965 | Luxembourg . |

OTHER PUBLICATIONS

Hydrometallurgy 4, 1–20 (1979) I. L. Jenkins, "Solvent Extraction Chemistry in the Atomic Energy Industry-A Review".

*Primary Examiner*—Frank Spear
*Attorney, Agent, or Firm*—Michael N. Meller

[57] ABSTRACT

The invention relates to a process for the reextraction in aqueous solution of the plutonium present in an organic solvent, more particularly usable for uranium-plutonium separation.

According to this process the organic solvent is contacted with an acid aqueous solution of uranous salt, e.g. uranous nitrate, and hydroxylamine salt, e.g. hydroxylamine nitrate. Under these conditions, the uranous nitrate acts as a reducing agent for plutonium at valency (III and the hydroxylamine nitrate, which is also a plutonium reducing, agent, stabilizes Pu(III) and U(IV) in aqueous phase.

Figure 2:
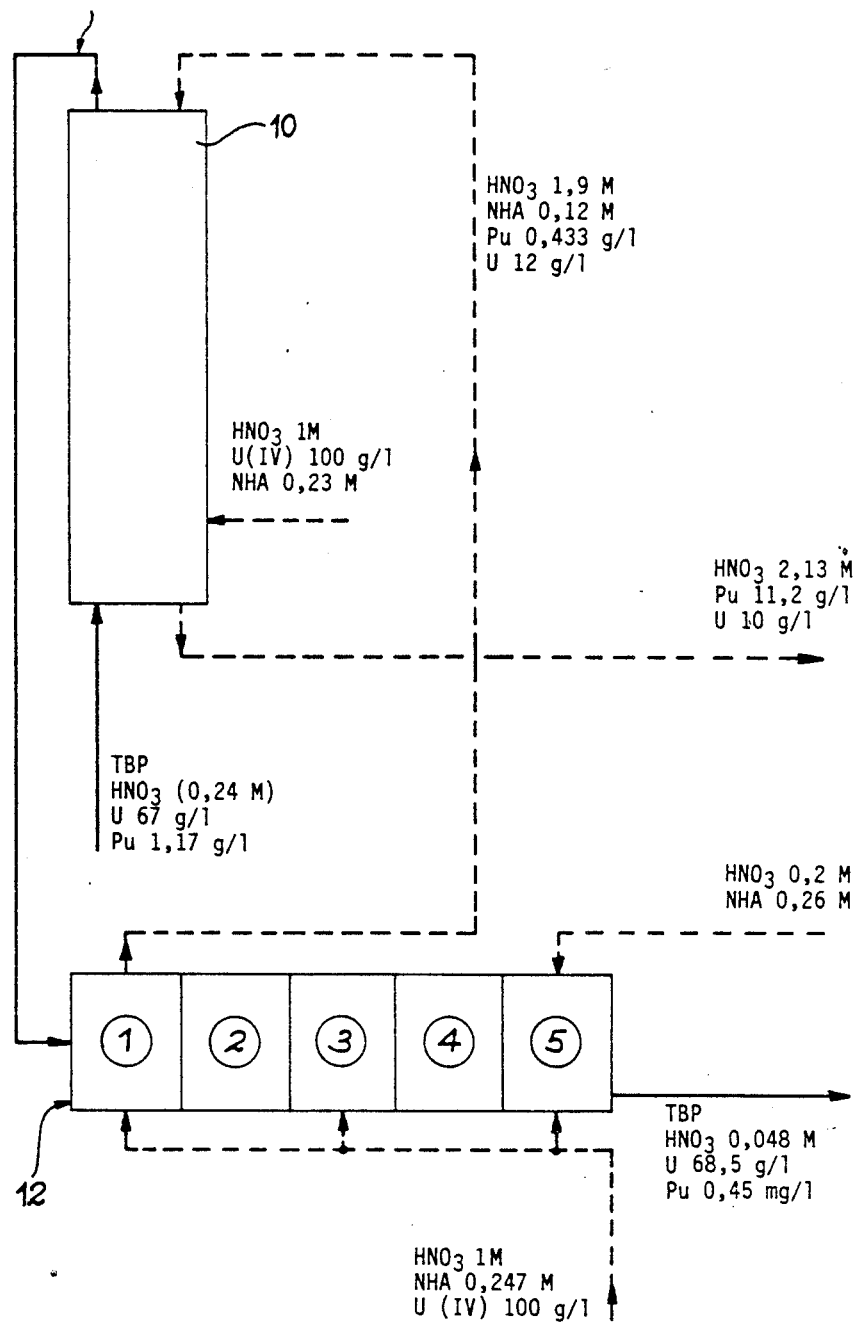

Performances comparable to those of the U(IV)-hydrazone nitrate system are obtained without forming prejudicial hydrazine nitrate decomposition products. (FIG. 2).

14 Claims, 4 Drawing Sheets

PROCESS FOR THE REEXTRACTION IN AQUEOUS SOLUTION OF THE PLUTONIUM PRESENT IN AN ORGANIC SOLVENT, MORE PARTICULARLY USABLE FOR SPLITTING URANIUM AND PLUTONIUM

DESCRIPTION

The present invention relates to a process for the reextraction in an aqueous solution of the plutonium present in an organic solvent.

This process can be more particularly used for separating the plutonium from the uranium in the initial stages of the reprocessing of irradiated nuclear fuels, or for reextracting the last plutonium traces at the end of uranium-plutonium splitting cycles or plutonium extraction cycles.

In most irradiated nuclear fuel reprocessing installations, the fuel is firstly dissolved in a nitric solution, which then undergoes a first extraction cycle consisting of simultaneously separating the plutonium and the uranium from most of the fission products by extraction in an organic solvent, e.g. tributyl phosphate. This is followed by the uranium-plutonium splitting operation, which consists of contacting the uranium-containing organic solvent, the plutonium and certain fission products with an aqueous solution containing a chemical agent able to reduce the plutonium from the (IV) to the (III) state in order to extract the latter in the aqueous phase, whereas the uranium remains in the organic solvent. For this operation, the generally used reducing agent is uranous nitrate to which is added a stabilizing agent constituted by hydrazine nitrate, whose function is to protect the reduced uranium (IV) and plutonium (III) species from the oxidizing agents present in the solution, because said reduced species are not stable in the absence of the stabilizing agent.

The use of hydrazine nitrate for stabilizing plutonium (III) and uranium (IV) has a number of disadvantages. Thus, hydrazine nitrate is liable to decompose under various conditions giving rise to two disturbing products, namely hydrazoic acid and ammonium ions.

The formation of the hydrazoic acid results from the main property of hydrazine nitrate, which is that of rapidly reacting with nitrous acid in accordance with the following reaction diagram:

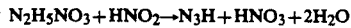

In the process of a hydrazine nitrate excess, H₃H is the main product formed, whereas in the presence of a HNO₂ excess, N₃H is broken down into N₂ and N₂O according to the following reaction diagram:

The formation of ammonium ions results from
(1) the reduction of Pu(IV) by hydrazine nitrate in accordance with the following reaction diagram:

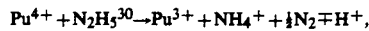

and
(2) the destruction of the hydrazine by nitrate ions, which is catalyzed by the technetium often present in the organic solvent of the first irradiated nuclear fuel reprocessing stage.

The presence of hydrazoic acid is particularly prejudicial, because the latter is liable to give unstable or explosive salts.

Another process or the reextraction of plutonium in an aqueous solution consists of carrying out the reduction of the Pu(IV) into Pu(III) using hydroxylamine nitrate, which serves both as a Pu(IV) reducing agent and as a stabilizing agent for the reduced species Pu(III) in the aqueous phase. However, in this case it is necessary to operate at a temperature of 50° to 80° C. in order to have an adequate reduction speed. However, it is not necessary to use hydrazine nitrate, although in certain cases this addition is also considered, which leads to the disadvantages referred to hereinbefore. Moreover, the major disadvantage of this process is due to the use of hydroxylamine nitrate as the reducing agent, because the latter reacts much more slowly than uranous nitrate. Therefore the performance characteristics of this process are more limited, because hydroxylamine nitrate is only really effective in a restricted operating range (low acidity, high temperature, long contact time, etc.).

The present invention relates to a process for the reextraction in an aqueous phase of the plutonium present in an organic solvent by reduction of plutonium (IV) to plutonium (III), which makes it possible to obtain results equivalent to those obtained with the uranous nitrate-hydrazine nitrate system, but without giving rise to the formation of prejudicial products, such as hydrazoic acid.

The process according to the invention for reextracting the plutonium present in an organic solvent in an aqueous solution consists of contacting said organic solvent with an aqueous solution constituted by an acid solution containing a uranous salt and a hydroxylamine salt. In this process, the uranous salt is the Pu(IV) reducing agent and it performs said reduction rapidly and quantitatively.

The hydroxylamine salt is here used as the agent stabilizing the valency (IV) of the uranium and the valency (III) of the plutonium in the acid medium. In the prior art process, the hydroxylamine sale was used as the stabilizing agent for the valency (III) of the plutonium, but in no case as the stabilizing agent for the valency (IV) of the uranium. Thus, the hydroxylamine salt advantageously replaces the hydrazine nitrate previously used as the stabilizer, particularly as it has the property of slowly reducing Pu(IV) into Pu(III).

In the invention, the use of a hydroxylamine salt associated with a uranous salt makes it possible to obtain the performance characteristics of the prior art uranous nitrate-hydrazine nitrate system without suffering from its disadvantages, i.e. the formation of prejudicial products.

The invention generally makes use of an aqueous solution constituted by a nitric acid solution preferably having a nitric acid concentration between 0.1 and 2.5 mole/l.

Numerous different uranous salts can be used. However, preference is generally given to the use of uranous nitrate, particularly when the aqueous reextraction solution is a nitric solution. The uranous salt quantity present in the reextraction solution is more particularly dependent on the plutonium quantity to be reextracted, which can reach 60 g.l⁻¹ and more. Generally use is made of an aqueous solution containing 2 to 150 g/l of uranous nitrate.

The hydroxylamine salts used in the inventive process can be formed from mineral or organic acids. Examples of the salts which can be used are hydroxylamine acetate, nitrate, sulphate, chloride, phosphate and formate. Preference is given to the use of hydroxylamine nitrate, particularly when the aqueous reextraction solution is a nitric solution.

The hydroxylamine salt quantity present in the aqueous reextraction solution is also dependent on the plutonium quantity to be reextracted, but also on the uranous nitrate quantity present in the reextraction solution. When the hydroxylamine salt is hydroxylamine nitrate, the aqueous solution generally contains $10^{-2}$ to 0.5 mole/l of hydroxylamine nitrate.

The contacting of the organic solvent containing the plutonium with the aqueous reextraction solution can take place in any conventional extraction apparatus, e.g. in mixer-settlers, pulsed columns, centrifugal extractors, etc.

It is possible to operate at ambient temperature and atmospheric pressure. HOwever, it is possible to use temperatures above or below ambient temperature. Generally contacting takes place in a temperature range between ambient temperature and 40° C., e.g. 20° to 40° C. These temperature conditions are not sufficiently high for the hydroxylamine to function as a reducing agent at an appreciable speed.

For this contacting operation, the organic solvent/aqueous solution volume ratios are chosen as a function of the plutonium concentrations of the organic solvent in such a way as to obtain a quasi-complete reextraction of the plutonium in the aqueous solution. Generally an aqueous reextraction solution/organic solvent volume ratio from 1 to 0.1 is used. The contact times used can be relatively short, e.g. at least roughly 1 minute.

The process described hereinbefore can be used for the uranium-plutonium splitting operation. It can also be used for reextracting the final traces of uranium present in an organic solvent during the final stage of certain cycles of the reprocessing of irradiated nuclear fuels, e.g. after uranium-plutonium splitting or after the complete plutonium separation cycle.

The plutonium-containing organic solvents which can be used in the process according to the invention can be of different types. These solvents generally comprise an inert diluent and an organic extractant. For example, said organic extractant can be chosen from among tributyl phosphate, amines, amides, diamides, acid organophosphorus compounds, neutral phosphine oxides, alkylthiophosphoric acids, etc.

Figure 1:
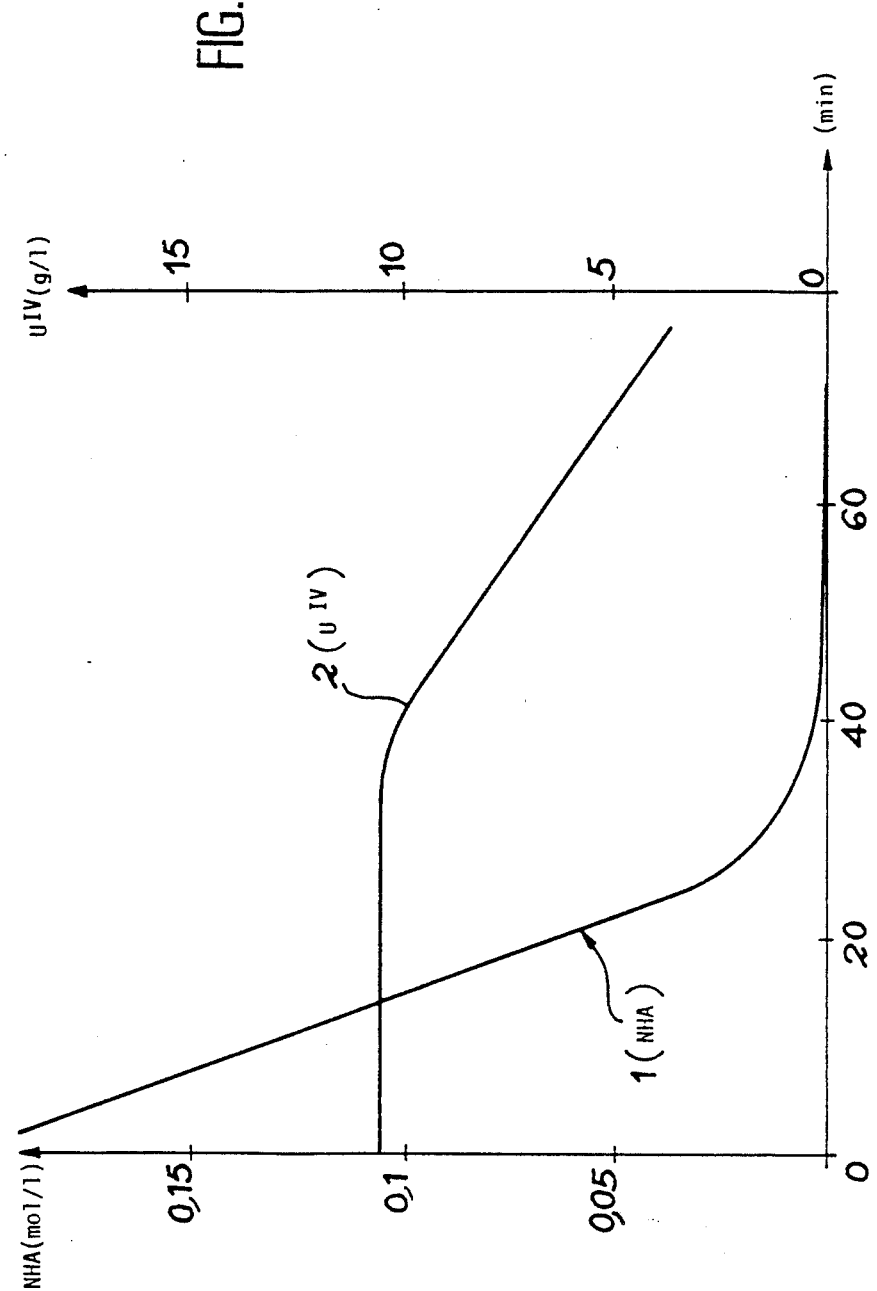

Other features and advantages of the invention can be better gathered from studying the following non-limitative examples with reference to the attached drawings, wherein show:

FIG. 1 A graph showing the evolution of an aqueous reextraction solution according to the invention as a function of time when nitrogen monoxide NO is bubbled into it.

FIG. 2 A diagrammatic representation of an installation incorporating a pulsed column and a mixer-settler in which the inventive process is performed.

Figure 3:
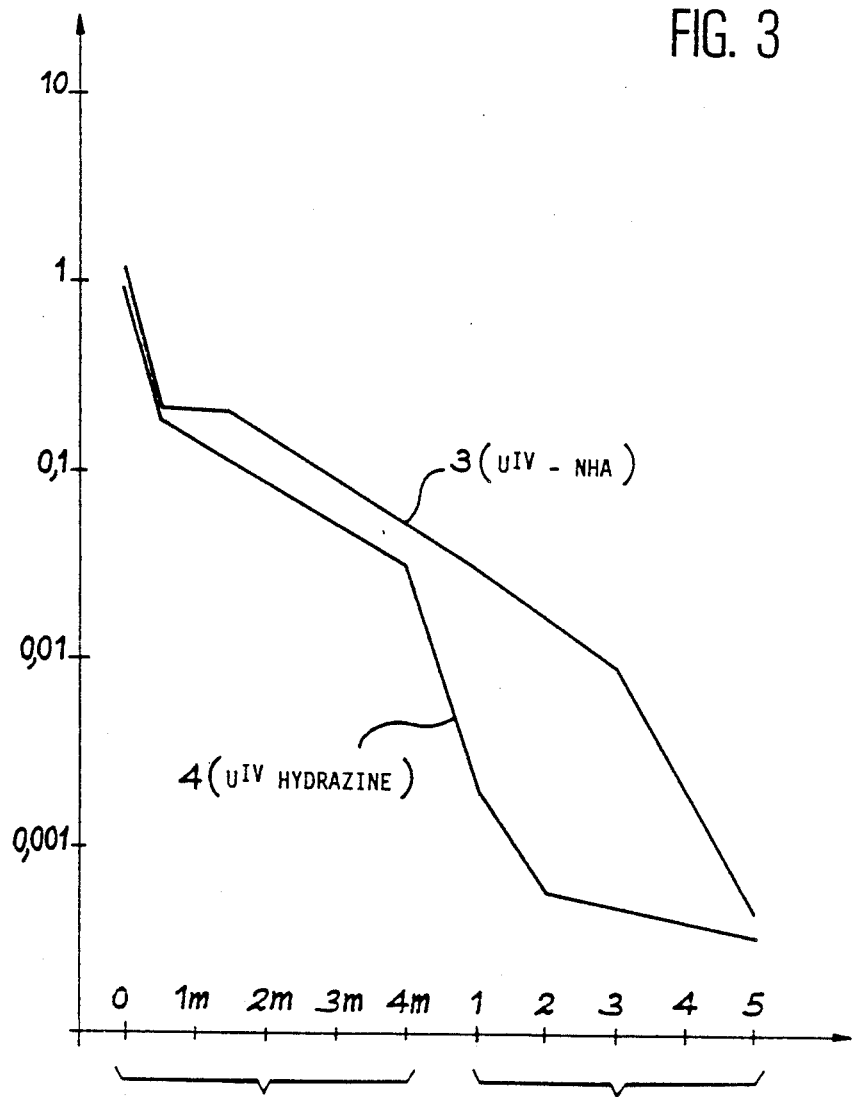

FIG. 3 A graph showing the evolution of the plutonium concentration of the organic solvent at different points in an installation.

Figure 4:
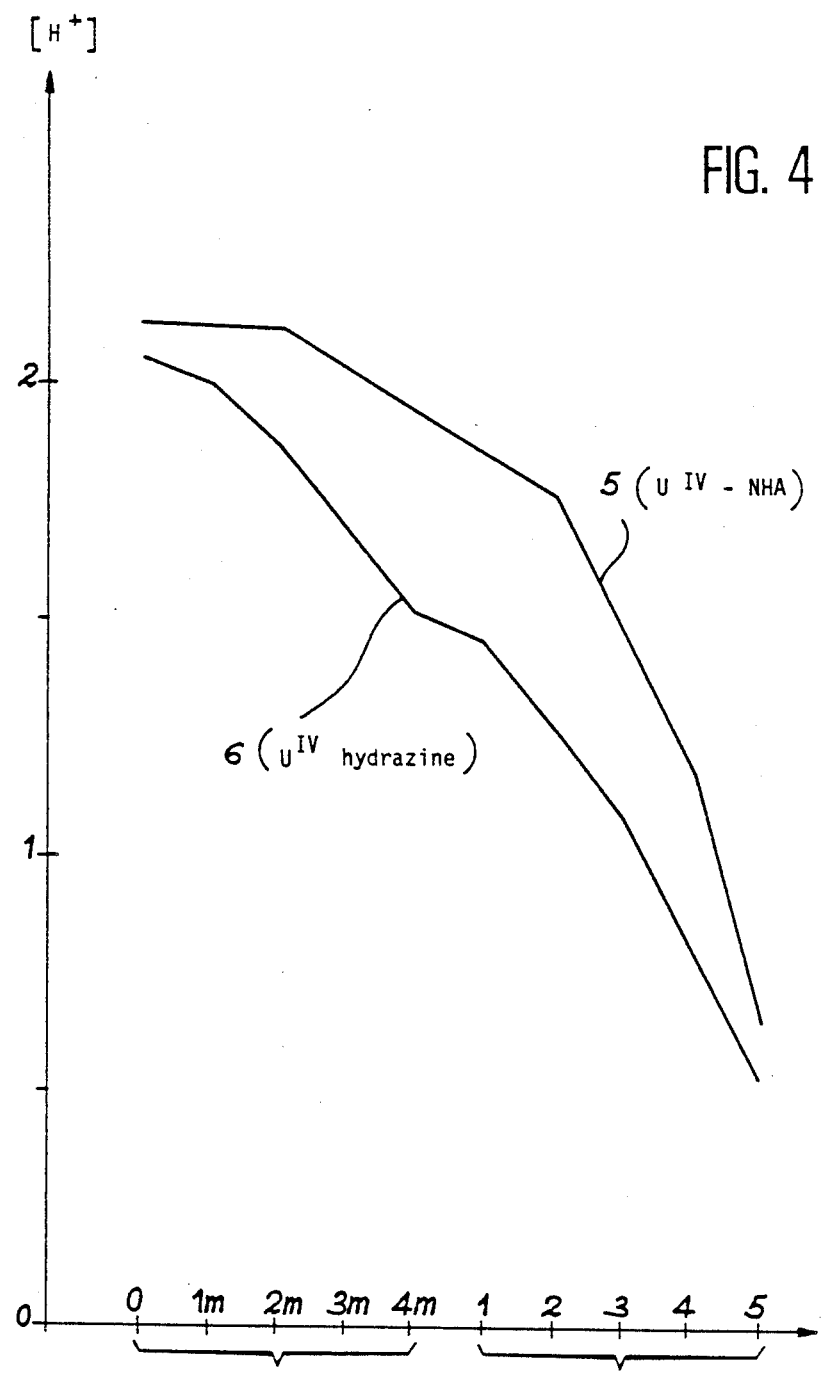

FIG. 4 A graph showing the evolution of the $H^{30}$ concentration of the aqueous phase at different points in an installation.

EXAMPLE 1

An aqueous reextraction solution is prepared by mixing an aqueous nitric acid solution, uranous nitrate and hydroxylamine nitrate (HAN) so as to obtain the following composition:

$HNO_3$: 1 mole/l,
U(IV): 110 g/l,
HAN: 0.2 mole/l.

This solution is stored for 2 months at ordinary temperature and protected from light, followed by the determination of its contents of $HNO_3$, U(IV) and hydroxylamine nitrate, giving the following results:

$HNO_3$: 1.1 mole/l,
U(IV): 100 g/l,
HAN: 0.19 mole/l.

It is clear that hydroxylamine nitrate has a good stabilizing power on uranium (IV), because the $HNO_3$, U(IV) and hydroxylamine nitrate contents have evolved little over the two months of storage.

EXAMPLE 2

In this example, as in example 1, an aqueous reextraction solution having the following composition is prepared:

$HNO_3$: 1 mole/l,
U(IV): 10.6 g/l,
HAN: 0.2 mole/l.

Nitrogen monoxide is bubbled into this solution and the uranium (IV) and hydroxylamine nitrate concentrations of the solution are determined as a function of time. The results obtained are given in the attached graph, where curve 1 represents the evolution of the hydroxylamine nitrate concentration (in mole/l) as a function of time (in min) and curve 2 represents the evolution of the uranium (IV) concentration (in g/l) as a function of time (in min). It can be seen that the hydroxylamine nitrate is slowly destroyed by $HNO_2$ formed in the solution, but that the uranium (IV) is not oxidized whilst the hydroxylamine nitrate content of the solution exceeds 0.01 mole/l.

Thus, hydroxylamine nitrate is very effective as a uranium (IV) stabilizer.

EXAMPLE 3

In this example, reextraction takes place of the plutonium present in an organic solvent constituted by an aliphatic diluent (e.g. TPH) containing 30% of tributyl phosphate and having the following composition;

$HNO_3$: 0.144 mole/l, U(VI): 78.5 g/l,
Tc: 24 mg/l,
Pu(IV): 0.83 g/l,
dibutyl phosphoric acid (DBP): 1 g/l.

For plutonium reextraction, use is made of an aqueous nitric acid solution containing uranous nitrate and hydroxylamine nitrate with the following composition:

$HNO_3$: 1 mole/l,
U(IV): 1.66 g/l,
HAN: 0.2 mole/l.

In order to carry out this reextraction, 3 cm³ of the organic solvent are contacted with 3 cm³ of the aqueous reextraction solution for 3 minutes at ambient temperature and accompanied by stirring. The organic solvent is then separated from the aqueous reextraction solution and its plutonium content is determined. These operations are repeated three times so as to carry out four successive contacts. The results obtained are given in table 1.

COMPARATIVE EXAMPLE 1

This example follows the same operating procedure as in example 3 for reextracting the plutonium present in an organic solvent having the same composition as that of example 3, but using as the aqueous reextraction solution a nitric solution of uranous nitrate and hydrazine nitrate ($NO_3N_2H_5$) having the following composition:

$HNO_3$: 1 mole/l,
U(IV): 1.66 g/l,
$N_2H_5$: 0.2 mole/l.

The results obtained under these conditions are given in table 1.

This table makes it clear that the results obtained with the uranous nitrate-hydroxylamine nitrate system are comparable with those obtained with the uranous nitrate-hydrazine nitrate system. Thus, the use of the system according to the invention is advantageous, because it gives the same results, whilst eliminating the disadvantages resulting from the use of hydrazine nitrate.

EXAMPLE 4

This example follows the operating procedure of example 3 for reextracting the plutonium from a plutonium-containing organic solvent and which contains little uranium. An aqueous reextraction solution constituted by a nitric solution of uranous nitrate and hydroxylamine nitrate is used, which has the following composition:

$HNO_3$: 1 mole/l,
U(IV): 20 g/l,
HAN: 0.2 mole/l.

It is used for reextracting the plutonium present in an organic solvent constituted by TPH containing 30% of tributyl phosphate having the following composition:

$HNO_3$: 0.3 mole/l,
Pu(IV): 10 g/l,
dibutyl phosphoric acid: 2 g/l,
U(VI): 0.3 g/l,
Tc: 20 mg/l.

The reextraction of the plutonium takes place following the operating procedure of example 3. The results are given in table 2.

COMPARATIVE EXAMPLE 2

This example uses the same operating procedure as in example 4 for reextracting the plutonium present in an organic solvent having the same composition as that of example 4, but using the aqueous reextraction solution a nitric solution of uranous nitrate and hydrazine nitrate with the following composition:

$HNO_3$: 1 mole/l,
U(IV): 20 g/l,
$N_2H_5$: 0.2 mole/l.

The results obtained are given in table 2.

These results make it clear that under these conditions, the aqueous reextraction solution according to the invention is as effective as the solution of uranous nitrate and hydrazine nitrate according to the prior art.

EXAMPLE 5

This example illustrates the reextraction of the plutonium (IV) in the presence of uranium (VI) in the pulsed column and at ambient temperature.

Into a 25 mm diameter and 4 m high pulsed column are introduced: at the bottom of the column and at a rate of 6.86 l/h, a charged organic solvent with the following composition:

30% by volume tributyl-phosphate in TPH
$HNO_3$: 0.24 mole/l
U: 67 g/l
Pu: 1.17 g/l at a height of 1 m, at a rate of 0.15 l/h, a reducing solution with the following composition:

$HNO_3$: 1 mole/l
U(IV): 100 g/l
HAN: 0.23 mole/l at the top of the column and at a rate of 0.585 l/h, a solution from the plutonium barrage or barrier having the following composition:

$HNO_3$: 1.9 mole/l
HAN: 0.12 mole/l
Pu: 0.433 g/l
U: 12 g/l.

Working takes place in the continuous aqueous phase and the following are obtained at equilibrium:
at the bottom of the column an aqueous solution with the following composition:

$HNO_3$: 2.13 mole/l
Pu: 11.2 g/l
U: 10 g/l at the top of the column a discharged solvent containing:

$HNO_3$: 0.183 mole/l
Pu: 0.049 g/l
U: 69.6 g/l.

Thus, a plutonium concentration factor of 9.04 and a uranium decontamination factor with respect to plutonium of 15.4 are obtained.

EXAMPLE 6

This example illustrates the deextraction of plutonium (IV) in the presence of uranium (VI), at ambient temperature, in a mixer-settler, which corresponds to the plutonium barrage from which has come the aqueous solution introduced at the top of the pulsed column of example 5.

Into a 5-stage mixer-settler are introduced:
in stage 1 and at a rate of 6.86 l/h, the organic solvent containing 30% of TBP in TPH and containing:

$HNO_3$: 0.183 mole/l
Pu: 0.049 g/l
U: 69.6 g/l which passes out of the pulsed column of example 5, in stage 5 and at a rate of 0.56 l/h, a reextraction solution having the following composition:

$HNO_3$: 0.2 mole/l
HAN: 0.26 mole/l.

The reducing agent with the following composition is introduced:

$HNO_3$: 1 mole/l
HAN: 0.24 mole/l
U(IV): 100 g/l
at stage 1, at a rate of 11 ml/h,
at stage 3, at a rate of 5 ml/h and
at stage 5, at a rate of 5 ml/h.

At the outlet from stage 1, an aqueous solution with the following composition is obtained:

$HNO_3$: 1.9 mole/l
HAN: 0.12 mole/l
Pu: 0.433 g/l
U: 12 g/l, and at the outlet from stage 5, an organic solvent containing:
$HNO_3$: 0.048 mole/l U: 68.5 g/l
Pu: 0.45 mg/l.

This corresponds to a plutonium concentration factor of 11.8 and a uranium to plutonium decontamination factor of 109.

FIG. 2 shows the aqueous and organic phase circulation digram corresponding to examples 5 and 6. Reference 10 designates the pulsed column of example 5 and reference 12 the 5-stage mixer-settler of example 6.

COMPARATIVE EXAMPLE 3

In this example there is a deextraction of plutonium (IV) in the presence or uranium (VI) in a pulsed column and deextraction of plutonium (IV) in the presence of uranium (VI) in a mixer-settler, as in examples 5 and 6, but using as the reducing solution a 1M nitric solution containing 100 g/l of uranium (IV) and 0.2 mole/l of hydrazine hydrate.

The following table 3 gives the Pu decontamination factors obtained under these conditions. This table also gives the results obtained in examples 5 and 6.

This table makes it clear that the performance characteristics obtained with the reducing solution according to the invention and containing uranium (IV) and a hydroxylamine salt are similar to those obtained when stabilizing the uranium (IV) reducing agent by hydrazine.

FIG. 3 shows the evolution of the plutonium concentration of the organic solvent in the pulsed column and in the mixer-settler as a function of the height in the pulsed column and the stage of the mixer-settler. In FIG. 3, curve 3 relates to examples 5 and 6 according to the invention, whilst curve 4 relates to comparative example 3. By comparing these two curves, it can be seen that at the outlet from the mixer-settler, the plutonium concentration is substantially the same in both cases.

FIG. 4 shows the evolution of the H+ ion concentration of the aqueous phase in the pulsed column and in the mixer-settler as a function of the height in the pulsed column and the stage in the mixer-settler. Curve 5 refers to examples 5 and 6, whilst curve 6 refers to comparative example 3.

TABLE 1

| Number of contacts | EXAMPLE 3 U(IV) + HAN | | COMPARATIVE EXAMPLE 1 U(IV) + N$_2$H$_5$ | |
|---|---|---|---|---|
| | (Pu)s mg.l$^{-1}$ | (Pu)s $\%_{\infty}$ | (Pu)s mg.l$^{-1}$ | (Pu)s $\%_{\infty}$ |
| 0 | 830 | 1000 | 830 | 1000 |
| 1 | 12.2 | 14.7 | 11.7 | 14.1 |
| 2 | 2.26 | 2.7 | 1.83 | 2.2 |
| 3 | 0.75 | 0.9 | 1.0 | 1.2 |
| 4 | 0.73 | 0.9 | 0.72 | 0.9 |

TABLE 2

| Number of contacts | EXAMPLE 4 U(IV) + HAN | | COMPARATIVE EXAMPLE 2 U(IV) + N$_2$H$_5$ | |
|---|---|---|---|---|
| | (Pu)s mg/l$^{-1}$ | (Pu)s $\%_{\infty}$ | (Pu)s mg/l$^{-1}$ | (Pu)s $\%_{\infty}$ |
| 0 | 10,000 | 1000 | 10,000 | 1000 |
| 1 | 483 | 48.3 | 345 | 34.5 |
| 2 | 51.9 | 5.19 | 36.7 | 0.37 |
| 3 | 5.4 | 0.54 | 4.3 | 0.43 |
| 4 | 0.67 | 0.067 | 0.66 | 0.066 |

TABLE 3

| | Pu decontamination factor | |
|---|---|---|
| | Comp. Ex. III | Ex. 5 and 6 |
| Deextraction in pulsed column (PC) | 19.4 | 15.4 |
| Deextraction in mixer-settler (MS) | 103 | 109 |
| PC and MS in series | 2000 | 1678 |

We claim:

1. Process for recovering plutonium present in an organic solvent which comprises contacting the organic solvent with an aqueous nitric acid solution of a uranous salt and a hydroxylamine salt.

2. Process according to claim 1, characterized in that the aqueous solution contains 0.1 to 2.5 mole/l of nitric acid.

3. Process according to claim 1, characterized in that the uranous salt is uranous nitrate.

4. Process according to claim 3, characterized in that the aqueous solution contains 2 to 150 g/l of uranous nitrate.

5. Process according to claim 3, characterized in that the hydroxylamine salt is hydroxylamine nitrate.

6. Process according to claim 5, characterized in that the organic solvent contains uranium and plutonium.

7. Process according to claim 5, characterized in that the organic solvent comprises an organic extractant chosen from among tributyl phosphate, amines, amides, diamides, acid phosphorus compounds, neutral phosphine oxides and alkylthiophosphoric acids.

8. Process according to claim 3, characterized in that the organic solvent contains uranium and plutonium.

9. Process according to claim 1, characterized in that the hydroxylamine salt is hydroxylamine nitrate.

10. Process according to claim 9, characterized in that the aqueous solution contains $10^{-2}$ to 0.5 mole/l of hydroxylamine nitrate.

11. Process according to claim 9, characterized in that the organic solvent contains uranium and plutonium.

12. Process according to claim 1, characterized in that the organic solvent contains uranium and plutonium.

13. Process according to claim 1, characterized in that the organic solvent comprises an organic extractant chosen from among tributyl phosphate, amines, amides, diamides, acid phosphorus compounds, neutral phosphine oxides and alkylthiophosphoric acids.

14. Process according to claim 1, characterized in that contacting takes place at a temperature between ambient temperature and 40° C.

* * * * *